United States Patent
Saito et al.

(10) Patent No.: US 8,206,795 B2
(45) Date of Patent: *Jun. 26, 2012

(54) LIQUID CRYSTAL COMPOSITION AND LIQUID CRYSTAL DISPLAY DEVICE

(75) Inventors: Masayuki Saito, Chiba (JP); Norikatsu Hattori, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/060,052

(22) PCT Filed: Aug. 24, 2009

(86) PCT No.: PCT/JP2009/064702
§ 371 (c)(1),
(2), (4) Date: Feb. 21, 2011

(87) PCT Pub. No.: WO2010/029843
PCT Pub. Date: Mar. 18, 2010

(65) Prior Publication Data
US 2011/0149226 A1    Jun. 23, 2011

(30) Foreign Application Priority Data

Sep. 9, 2008  (JP) ................................. 2008-231103

(51) Int. Cl.
C09K 19/32 (2006.01)
C09K 19/34 (2006.01)
C09K 19/30 (2006.01)
C09K 19/12 (2006.01)
C09K 19/20 (2006.01)

(52) U.S. Cl. ............... 428/1.1; 252/299.61; 252/299.62; 252/299.63; 252/299.66; 252/299.67

(58) Field of Classification Search ............. 252/299.61, 252/299.62, 299.63, 299.66, 299.67; 428/1.1
See application file for complete search history.

(56) References Cited

U.S. PATENT DOCUMENTS

| | | | | |
|---|---|---|---|---|
| 2011/0037912 A1* | 2/2011 | Saito et al. | ...................... | 349/33 |
| 2011/0089373 A1* | 4/2011 | Yanai et al. | .............. | 252/299.61 |
| 2011/0096285 A1* | 4/2011 | Saito | ............................. | 349/182 |
| 2011/0097519 A1* | 4/2011 | Yanai et al. | .................... | 428/1.2 |
| 2011/0147658 A1* | 6/2011 | Saito et al. | ............... | 252/299.61 |
| 2011/0198536 A1* | 8/2011 | Saito et al. | ............... | 252/299.61 |
| 2011/0272631 A1* | 11/2011 | Saito | ........................ | 252/299.61 |

FOREIGN PATENT DOCUMENTS

| | | |
|---|---|---|
| JP | 2001-115161 | 4/2001 |
| JP | 2001-262145 | 9/2001 |
| JP | 2005-281560 | 10/2005 |
| JP | 2005-290349 | 10/2005 |

* cited by examiner

*Primary Examiner* — Shean Wu
(74) *Attorney, Agent, or Firm* — J.C. Patents

(57) ABSTRACT

A liquid crystal composition is provided that satisfies at least one characteristic among the characteristics such as a high maximum temperature of a nematic phase, a low minimum temperature of a nematic phase, a small viscosity, a suitable optical anisotropy, negatively large dielectric anisotropy, a large specific resistance, a high stability to ultraviolet light and a high stability to heat, or is properly balanced regarding at least two characteristics. An AM device is provided that has a short response time, a large voltage holding ratio, a large contrast ratio, a long service life and so forth.

The liquid crystal composition contains tetrahedropyrene-2,5-diyl as the first component, a specific compound having negatively large dielectric anisotropy as the second component, and a negatively dielectric anisotropy. The liquid crystal display device contains the liquid crystal composition.

17 Claims, No Drawings

LIQUID CRYSTAL COMPOSITION AND LIQUID CRYSTAL DISPLAY DEVICE

BACKGROUND OF THE INVENTION

1. Field of the Invention

The invention relates to a liquid crystal composition suitable for use in an active matrix (AM) device, and an AM device containing the composition. More specifically, the invention relates to a liquid crystal composition having a negative dielectric anisotropy, and also relates to a device of an in plane switching (IPS) mode, a vertical alignment (VA) mode or a polymer sustained alignment (PSA) mode containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), polymer sustained alignment (PSA) and so forth. Classification based on a driving mode of the device includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is 0° C. or more and a desirable minimum temperature is −10° C. or less. The viscosity of the composition relates to the response time of the device. The rotation viscosity of the composition also relates to the response time of the device. A short response time is desirable for displaying a moving image. Accordingly, a small viscosity of the composition is desirable. A small viscosity at a low temperature is more desirable.

TABLE 1

General Characteristics of Liquid Crystal Composition and AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Threshold voltage is low, electric power consumption is small, and contrast ratio is large |
| 5 | Specific resistance is large | Voltage holding ratio is large, and a contrast ratio is large |
| 6 | It is stable to ultraviolet light and heat | Service life is long |

[1] A liquid crystal composition can be injected into a cell in a short time.

The optical anisotropy of the composition relates to the contrast ratio of the device. A product ($\Delta n \times d$) of the optical anisotropy ($\Delta n$) of the composition and the cell gap (d) of the device is designed to maximize the contrast ratio. A suitable value of the product depends on the kind of operation mode. In a device having a VA mode, a suitable value is in a range of from 0.30 μm to 0.40 and in a device having an IPS mode, a suitable value is in a range of from 0.20 μm to 0.30 μm. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life. These characteristics are desirable for an AM device used in a liquid crystal projector, a liquid crystal television and so forth.

In an AM device having a TN mode, a composition having a positive dielectric anisotropy is used. In an AM device having a VA mode, a composition having a negative dielectric anisotropy is used. In an AM device having an IPS mode, a composition having a positive or negative dielectric anisotropy is used. In an AM device having a PSA mode, a composition having a positive or negative dielectric anisotropy is used. Examples of the liquid crystal composition having a negative dielectric anisotropy are disclosed in JP 2001-262145 and JP 2001-115161.

A desirable AM device is characterized as having a usable temperature range that is wide, a response time that is short, a contrast ratio that is large, a threshold voltage that is low, a voltage holding ratio that is large, a service life that is long, and so forth. Even one millisecond shorter response time is desirable. Thus, the composition having characteristics such as a high maximum temperature of a nematic phase, a low minimum temperature of a nematic phase, a small viscosity, a suitable optical anisotropy, a large dielectric anisotropy, a large specific resistance, a high stability to an ultraviolet light, a high stability to heat, and so forth is especially desirable.

SUMMARY OF THE INVENTION

The invention concerns a liquid crystal composition having a negative dielectric anisotropy that includes two components, wherein the first component is at least one compound selected from the group of compounds represented by formula (1), the second component is at least one compound selected from the group of compounds represented by formula (2):

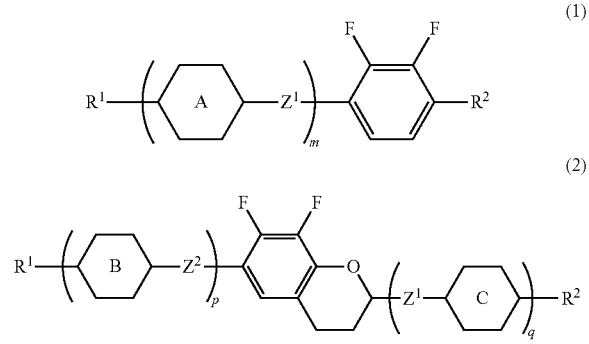

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene, or 1,4-phenylene; at least one ring A is tetrahydropyran-2,5-diyl; ring B and ring C are each independently 1,4-cyclohexylene or 1,4-phenylene; $Z^1$ and $Z^2$ are each independently a single bond, ethylene, methyleneoxy or carbonyloxy; m is 1, 2 or 3; p and q are each independently 0,1,2 or 3, and the sum of p and q is three or less.

The invention also concerns a liquid crystal display device that includes the liquid crystal composition, and so forth.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains, for example, a 6-membered ring such as 1,4-cyclohexylene and 1,4-phenylene, and a rod like molecular structure. An optically active compound or a polymerizable compound may occasionally be added to the composition. Even in the case where the compound is a liquid crystal compound, the compound is classified into an additive. At least one compound selected from a group of compounds represented by formula (1) may be abbreviated to "the compound (1)." The "compound (1)" means one compound or two or more compounds represented by formula (1). The other formulas are applied with the same rules. The term "arbitrary" means that not only the position but also the number are arbitrary, but the case where the number is zero is not included.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also nearly at the maximum temperature of a nematic phase in the initial stage, the composition has a large specific resistance at room temperature and also nearly at the maximum temperature of a nematic phase even after it has been used for a long time. "A voltage holding ratio is large" means that a device has a large voltage holding ratio at room temperature and also nearly at the maximum temperature of a nematic phase in the initial stage, the device has a large voltage holding ratio at room temperature and also nearly at the maximum temperature of a nematic phase even after it has been used for a long time. In the description of the characteristics such as optical anisotropy, the characteristics of the composition such as the optical anisotropy and so forth are values measured in the methods disclosed in Examples. The first component includes one compound or two or more compounds. "A ratio of the first component" means the percentage by weight (% by weight) of the first component based on the total weight of liquid crystal composition. A ratio of the second component and so forth are applied with the same rule. A ratio of an additive mixed with the composition means the percentage by weight (% by weight) based on the total weight of liquid crystal composition.

In the chemical formulas of the component compounds, symbol $R^1$ is used in plural compounds. In these compounds, two arbitrary $R^1$ may be the same as or different from each other. In one case, for example, $R^1$ of the compound (1) is ethyl and $R^1$ of the compound (2) is ethyl. In another case, $R^1$ of the compound (1) is ethyl and $R^1$ of the compound (2) is propyl. This rule is also applicable to the symbols $R^2$, $Z^1$ and so forth.

One of the advantages of the invention is to provide a liquid crystal composition that satisfies at least one characteristic among the characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light and a high stability to heat and so forth. Another advantage of the invention is to provide a liquid crystal composition that is properly balanced regarding at least two characteristics among many characteristics. Another advantage of the invention is to provide a liquid crystal display device that contains the liquid crystal composition. Another of the advantage of the invention is to provide a liquid crystal composition that has a suitable optical anisotropy, whether it is large or small, a negatively large dielectric anisotropy, and a high stability to ultraviolet light and so forth. Another of the advantage is to provide an AM device that has a short response time, a large voltage holding ratio, a large contrast ratio, a long service life and so forth.

The invention has the following features.

1. The invention concerns a liquid crystal composition having a negative dielectric anisotropy that includes two components, wherein the first component is at least one compound selected from the group of compounds represented by formula (1), the second component is at least one compound selected from the group of compounds represented by formula (2):

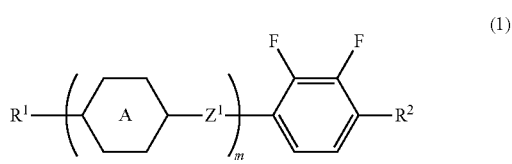

(2)

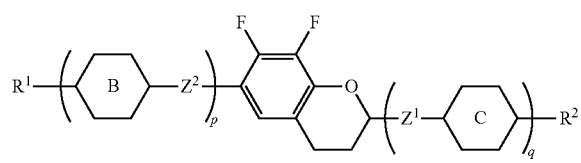

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene or 1,4-phenylene; at least one ring A is tetrahydropyran-2,5-diyl; ring B and ring C are each independently 1,4-cyclohexylene or 1,4-phenylen; $Z^1$ and $Z^2$ are each independently a single bond, ethylene, methyleneoxy or carbonyloxy; and m is 1, 2 or 3, p and q are each independently 0, 1, 2 or 3; and the sum of p and q is 3 or less.

2. The liquid crystal composition according to item 1, wherein the first component is at least one compound selected from the group of compounds represented by formula (1-1) to (1-7):

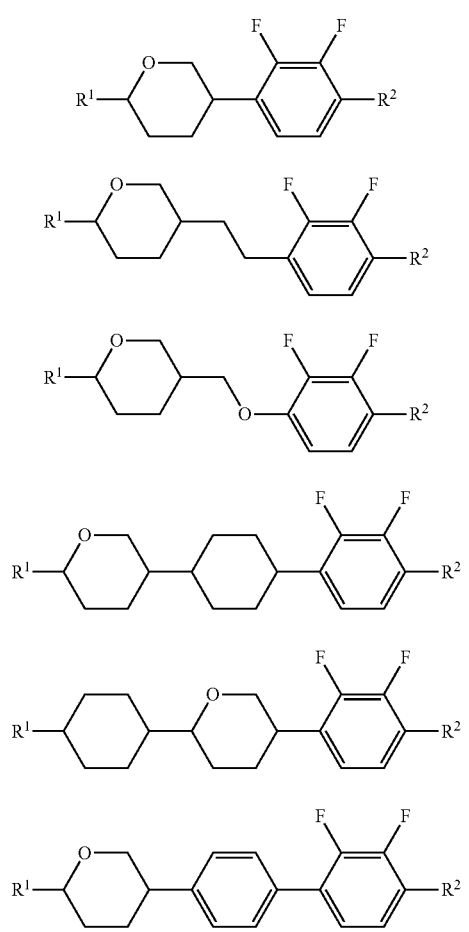

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to item 2, wherein the first component is at least one compound selected from the group of compounds represented by formula (1-1) to (1-3):

4. The liquid crystal composition according to item 2, wherein the first component is at least one compound selected from the group of compounds represented by formula (1-4) to (1-7).

5. The liquid crystal composition according to item 2, wherein the first component is a mixture of at least one compound selected from the group of compounds represented by formula (1-1) to (1-3), and at least one compound selected from the group of compounds represented by formula (1-4) to (1-7).

6. The liquid crystal composition according to any one of items 1 to 5, wherein the second component is at least one compound selected from the group of compounds represented by formula (2-1) to (2-4).

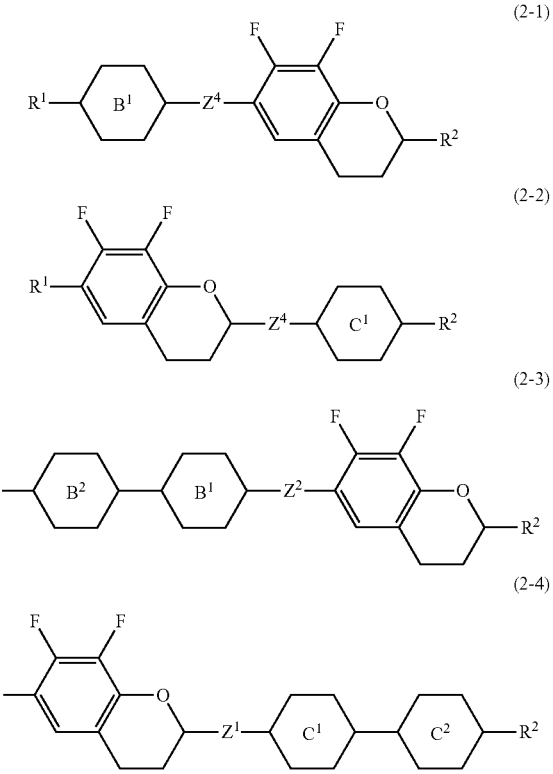

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring $B^1$, ring $B^2$, ring $C^1$ and ring $C^2$ are each independently 1,4-cyclohexylene, or 1,4-phenylene; $Z^1$ and $Z^2$ is each independently a single bond, ethylene, methyleneoxy or carbonyloxy; $Z^4$ is ethylene, methyleneoxy or carbonyloxy.

7. The liquid crystal composition according to item 6, wherein the second component is at least one compound selected from the group of compounds represented by formula (2-3).

8. The liquid crystal composition according to item 6, wherein the second component is at least one compound selected from the group of compounds represented by formula (2-4).

9. The liquid crystal composition according to any one of items 1 to 8, wherein a ratio of the first component is from 5% by weight to 70% by weight, and a ratio of the second component is from 5% by weight to 30% by weight based on the total weight of the liquid crystal composition.

10. The liquid crystal composition according to any one of items 1 to 9, wherein the third component is at least one compound selected from the group of compounds represented by formula (3).

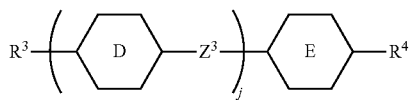

(3)

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D and ring E are each independently 1,4-cyclohexylene, 1,4-phenylene, 2-fluoro-1,4-phenylene, 3-fluoro-1,4 phenylene, or 2,5-difluoro-1,4-phenylene; $Z^3$ is independently a single bond, ethylene or carbonyloxy; and j is 1, 2 or 3.

11. The liquid crystal composition according to item 10, wherein the third component is at least one compound selected from the group of compounds represented by formulas (3-1) to (3-10).

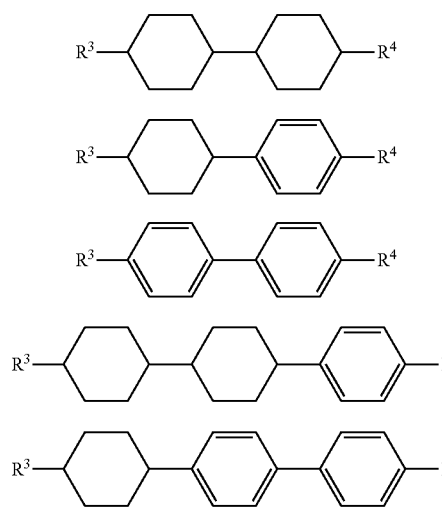

(3-1)
(3-2)
(3-3)
(3-4)
(3-5)

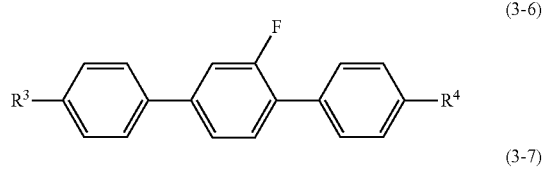

(3-6)

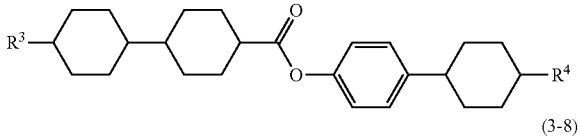

(3-7)

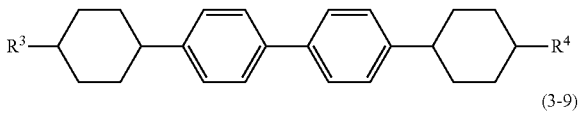

(3-8)

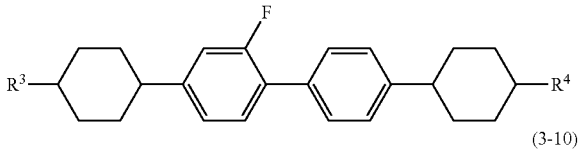

(3-9)

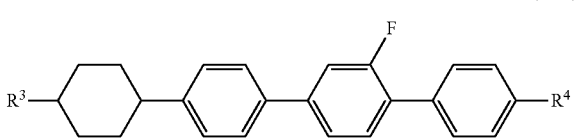

(3-10)

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

12. The liquid crystal composition according to item 11, wherein the third component is at least one compound selected from the group of compounds represented by formula (3-1).

13. The liquid crystal composition according to item 11, wherein the third component is a mixture of at least one compound selected from the group of compounds represented by formula (3-1) and at least one compound selected from the group of compounds represented by formula (3-4).

14. The liquid crystal composition according to item 11, wherein the third component is a mixture of at least one compound selected from the group of compounds represented by formula (3-1) and at least one compound selected from the group of compounds represented by formula (3-6).

15. The liquid crystal composition according to item 11, wherein the third component is a mixture of at least one compound selected from the group of compounds represented by formula (3-6) and at least one compound selected from the group of compounds represented by formula (3-10).

16. The liquid crystal composition according to item 11, wherein the third component is a mixture of at least one compound selected from the group of compounds represented by formula (3-1), at least one compound selected from the group of compounds represented by formula (3-4), and at least one compound selected from the group of compounds represented by formula (3-6).

17. The liquid crystal composition according to any one of items 10 to 16, wherein a ratio of the third component is from 30% by weight to 70% by weight based on the total weight of the liquid crystal composition.

18. The liquid crystal composition according to any one of items 1 to 17, wherein the fourth component is at least one compound selected from the group of compounds represented by formula (4).

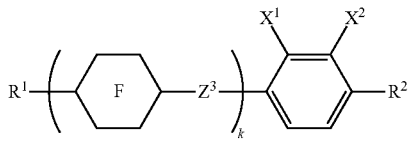
(4)

wherein R¹ and R² are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring F is independently 1,4-cyclohexylene, or 1,4-phenylene; Z³ is independently a single bond, ethylene or carbonyloxy; X¹ and X² are each independently fluorine or chlorine; k is 1, 2 or 3.

19. The liquid crystal composition according to item 18, wherein the fourth component is at least one compound selected from the group of compounds represented by formula (4-1) to (4-7).

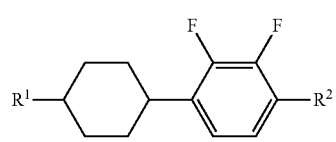
(4-1)

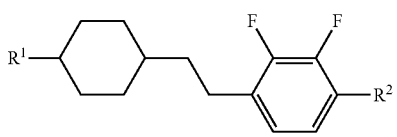
(4-2)

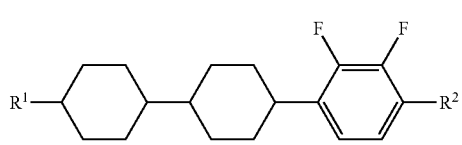
(4-3)

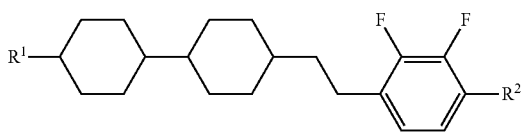
(4-4)

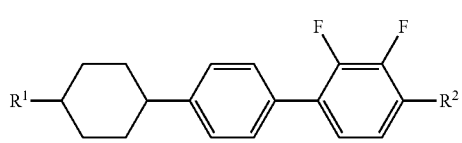
(4-5)

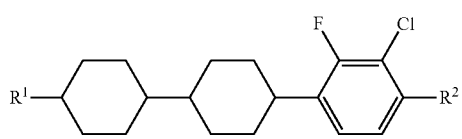
(4-6)

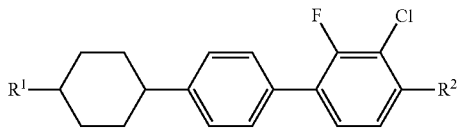
(4-7)

wherein R¹ and R² are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

20. The liquid crystal composition according to item 19, wherein the fourth component is at least one compound selected from the group of compounds represented by formula (4-1).

21. The liquid crystal composition according to item 19, wherein the fourth component is a mixture of at least one compound selected from the group of compounds represented by formula (4-1) and at least one compound selected from the group of compounds represented by formula (4-5).

22. The liquid crystal composition according to any one of items 18 to 21, wherein a ratio of the fourth component is from 5% by weight to 55% by weight based on the total weight of the liquid crystal composition.

23. The liquid crystal composition according to any one of items 1 to 22, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of −2 or less.

24. A liquid crystal device display that includes the liquid crystal composition according to any one of items 1 to 23.

25. The liquid crystal composition according to item 24, wherein the liquid crystal display device has an operation mode of a VA mode, an IPS mode or a PSA mode, and has a driving mode of an active matrix mode.

The invention further includes: (1) the composition described above, wherein the composition further contains an optically active compound; (2) the composition described above, wherein the composition further contains an additive, such as an antioxidant, an ultraviolet light absorbent, an antifoaming agent; (3) an AM device containing the composition described above; (4) a device having a TN, ECB, OCB, IPS, VA or PSA mode, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, combinations of components in the composition, desirable ratios of the component compounds and the basis thereof will be explained. Fourth, a desirable embodiment of the component compounds will be explained. Fifth, examples of the component compound will be shown. Sixth, additives that may be added to the composition will be explained. Seventh, the preparation methods of the component compound will be explained. Lastly, use of the composition will be explained.

First, the constitution of component compounds in the composition will be explained. The composition of the invention is classified into the composition A and the composition B. The composition A may further contain other compounds such as another liquid crystal compound, an additive, an impurity, and so forth. "Another liquid crystal compound" is different from the compound (1), the compound (2), the compound (3), and the compound (4). Such a liquid crystal compound is mixed with the composition for the purpose of adjusting the characteristics of the composition. Among the other liquid crystal compounds, an amount of a cyano compound is desirably small from the viewpoint of stability to heat or ultraviolet light. The more desirable amount of a cyano compound is 0% by weight. The additive includes an optically active compound, an antioxidant, an ultraviolet light absorbent, a coloring matter, an antifoaming agent, a polymerizable compound, a polymerization initiator and so forth. The impurity is a compound and so forth contaminated in the process such as the synthesis of a component compound and so forth. Even when the compound is a liquid crystal compound, it is classified into an impurity herein.

The composition B essentially consists of the compounds selected from the compound (1), the compound (2), the compound (3), and the compound (4). The term "essentially" means that the composition does not contain a liquid crystal compound that is different from these compounds, except for the additive and the impurity. The components of the composition B are fewer than those of the composition A. The composition B is preferable to the composition A from the viewpoint of cost reduction. The composition A is preferable to the composition B, because characteristics of the composition A can be further adjusted by mixing other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classification based on qualitative comparison among the component compounds. 0 represents almost zero.

TABLE 2

Characteristics of Compounds

| Compound | (1) | (2) | (3) | (4) |
|---|---|---|---|---|
| Maximum temperature | M-L | S-M | S-L | M-L |
| Viscosity | M-L | L | S-M | M-L |
| Optical anisotropy | M | M-L | S-L | M-L |
| Dielectric anisotropy | M-L[1)] | L[1)] | 0 | S-M[1)] |
| Specific resistance | L | L | L | L |

[1)]The value of dielectric anisotropy is negative, and the symbol indicates the absolute value.

The main effects of the component compounds to the characteristics of the composition upon mixing the component compounds in the composition are as follows. The compound (1) increases the dielectric anisotropy and decreases the minimum temperature. The compound (2) decreases the dielectric anisotropy. The compound (3) decreases the viscosity or increases the maximum temperature. The compound (4) increases the optical anisotropy or decreases the minimum temperature.

Third, combinations of components in the composition, desirable ratios of the component compounds and the basis thereof will be explained. Examples of the combinations of the components in the composition include (first component+second component), (first component+second component+third component), (first component+second component+fourth component) and (first component+second component+third component+fourth component). Desirable combinations of the components in the composition include (first component+second component+third component), and (first component+second component+third component+fourth component).

A desirable ratio of the first component is 5% by weight or more for increasing the dielectric anisotropy, and is 70% by weight or less for decreasing the minimum temperature. A more desirable ratio is from 5% by weight to 60% by weight. A particularly desirable ratio is from 5% by weight to 50% by weight.

A desirable ratio of the second component is 5% by weight or more for increasing the dielectric anisotropy, and is 30% by weight or less for decreasing the viscosity. A more desirable ratio is from 5% by weight to 25% by weight. A particularly desirable ratio is from 5% by weight to 20% by weight.

A desirable ratio of the third component is 30% by weight or more for decreasing the viscosity or increasing the maximum temperature, and is 70% by weight or less for increasing the dielectric anisotropy. A more desirable ratio is from 35% by weight to 65% by weight for decreasing the viscosity. A particularly desirable ratio is from 40% by weight to 60% by weight for decreasing the viscosity.

A desirable ratio of the fourth component is 5% by weight or more for increasing the optical anisotropy, and is 55% by weight or less for decreasing the minimum temperature. A more desirable ratio is from 5% by weight to 50% by weight. A particularly desirable ratio is from 5% by weight to 45% by weight.

Fourth, a desirable embodiment of the component compound will be explained. $R^1$, $R^2$, $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Desirable $R^1$ and $R^2$ are each independently alkyl having 1 to 12 carbons for increasing the stability to ultraviolet light or heat, alkoxy having 1 to 12 carbons for increasing the dielectric anisotropy. Desirable $R^3$ and $R^4$ are each independently alkyl having 1 to 12 carbons for increasing the stability to ultraviolet light or heat, or alkenyl having 2 to 12 carbons for decreasing the minimum temperature.

Desirable alkyl is methyl, ethyl, propyl, butyl, pentyl, hexyl, heptyl, or octyl. More desirable alkyl is ethyl, propyl, butyl, pentyl or heptyl for decreasing a viscosity.

Desirable alkoxy is methoxy, ethoxy, propoxy, butoxy, pentyloxy, hexyloxy, or heptyloxy. More desirable alkoxy is methoxy or ethoxy for decreasing a viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing a viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing a viscosity. C is desirable in the alkenyl such as 2-butenyl, 2-pentenyl and 2-hexenyl. In these alkenyls, linear alkenyl is preferable to branched alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4- pentenyl, and 6,6-difluoro-5-hexenyl. More preferred examples thereof include 2,2-difluorovinyl and 4,4-difluoro-3-butenyl for decreasing a viscosity.

Ring A is independently tetrahydropyran-2,5-diyl, 1,4-cyclohexylene, or 1,4-phenylene, and at least one ring A is tetrahydropyran-2,5-diyl. When m is 2 or 3, two arbitrary rings A may be the same as or different from each other. Desirable ring A is independently 1-pyrane-2,5-diyl for increasing the dielectric anisotropy. Ring B, Ring $B^1$, Ring $B^2$, ring C, ring $C^1$ and ring $C^2$ are each independently 1,4-cyclohexylene, or 1,4-phenylene. Two arbitrary ring B may be the same or different from each other, when p is 2 or 3. Two arbitrary ring C may be the same or different from each other, when q is 2 or 3. Desirable ring B, Ring $B^1$ Ring $B^2$, ring C, ring $C^1$ and ring $C^2$ are each independently 1,4-cyclohexylene for decreasing the optical anisotropy. Ring D and ring E are each independently 1,4-cyclohexylene, 1,4-phenylene, 2-fluoro-1,4-phenylene, 3-fluoro-1,4-phenylene or 2,5-difluoro-1,4-phenylene, and when j is 2 or 3, two arbitrary ring D may be the same as or different from each other. Desirable ring D and ring E are each independently 1,4-cyclohexylene for decreasing the viscosity. Ring F is independently 1,4-cyclohexylene or 1,4-phenylene, and when k is 2 or 3, two arbitrary ring F may be the same as or different from each other. Desirable ring F is each 1,4-cyclohexylene for decreasing the optical anisotropy.

$Z^1$ and $Z^2$ are each independently a single bond, ethylene, methyleneoxy or carbonyloxy, and when m and q are 2 or 3, two arbitrary $Z^1$ may be the same as or different from each other, and when p is 2 or 3, two arbitrary $Z^2$ may be the same as or different from each other. Desirable $Z^1$ and $Z^2$ are each independently a single bond for decreasing the viscosity, or methyleneoxy for increasing the dielectric anisotropy. $Z^3$ is independently a single bond, ethylene, or carbonyloxy, and when j and K are 2 or 3, two arbitrary Z may be the same as or different from each other. Desirable $Z^3$ is each independently a single bond for decreasint the viscosity. $Z^4$ is independently ethylene, methyleneoxy or carbonyloxy. Desirable $Z^4$ is each independently methyleneoxy for increasing the dielectric anisotropy.

$X^1$ and $X^2$ are each independently fluorine or chlorine. Desirable $X^1$ and $X^2$ are fluorine for decreasing the viscosity.

m is 1, 2 or 3. Desirable m is 1 for decreasing the minimum temperature, and is 2 for increasing the maximum temperature. P and q are each independently 0, 1, 2 or 3, and the sum of p and q is three or less. Desirable p is 2 for increasing the maximum temperature. Desirable q is 0 for decreasing the minimum temperature. j is 1, 2 or 3. Desirable j is 1 for decreasing the viscosity. k is 1, 2 or 3. Desirable k is 1 for decreasing the minimum temperature.

Fifth, examples of the component compounds will be shown. In the desirable compounds described below, $R^5$ is independently linear alkyl having 1 to 12 carbons or linear alkoxy having 1 to 12 carbons. $R^6$ and $R^7$ are each independently linear alkyl having 1 to 12 carbons or linear alkenyl having 2 to 12 carbons. In these desirable compounds, trans is preferable to cis for the configuration of 1,4-cyclohexylene for increasing the maximum temperature.

Desirable compounds (1) are the compounds (1-1-1) to (1-7-1). More desirable compounds (1) are the compounds (1-1-1), (1-3-1), (1-5-1) and (1-7-1). Particularly desirable compounds (1) are (1-1-1) and compounds (1-5-1). Desirable compounds (2) are the compounds (2-1-1), (2-1-2), (2-2-1), compounds (2-3-1) to (2-3-5), compounds (2-4-1), and (2-4-2). More desirable compounds (2) are the compounds (2-1-2), (2-3-1), (2-3-3) and compounds (2-4-1). Particularly desirable compounds (2) are compounds (2-1-2) and (2-3-3).

Desirable compounds (3) are the compounds (3-1-1) to compounds (3-10-1). More desirable compounds (3) are the compounds (3-1-1), compounds (3-3-1), compounds (3-4-1), compounds (3-6-1) and compounds (3-1-1). Particularly desirable compounds (3) are compounds (3-1-1), (3-4-1) and (3-6-1). Desirable compounds (4) are the compounds (4-1-1) to (4-7-1). More desirable compounds (4) are the compounds (4-1-1), (4-2-1), (4-3-1), (4-4-1) and (4-5-1). Particularly desirable compounds (4) are the compounds (4-1-1), (4-3-1) and (4-5-1).

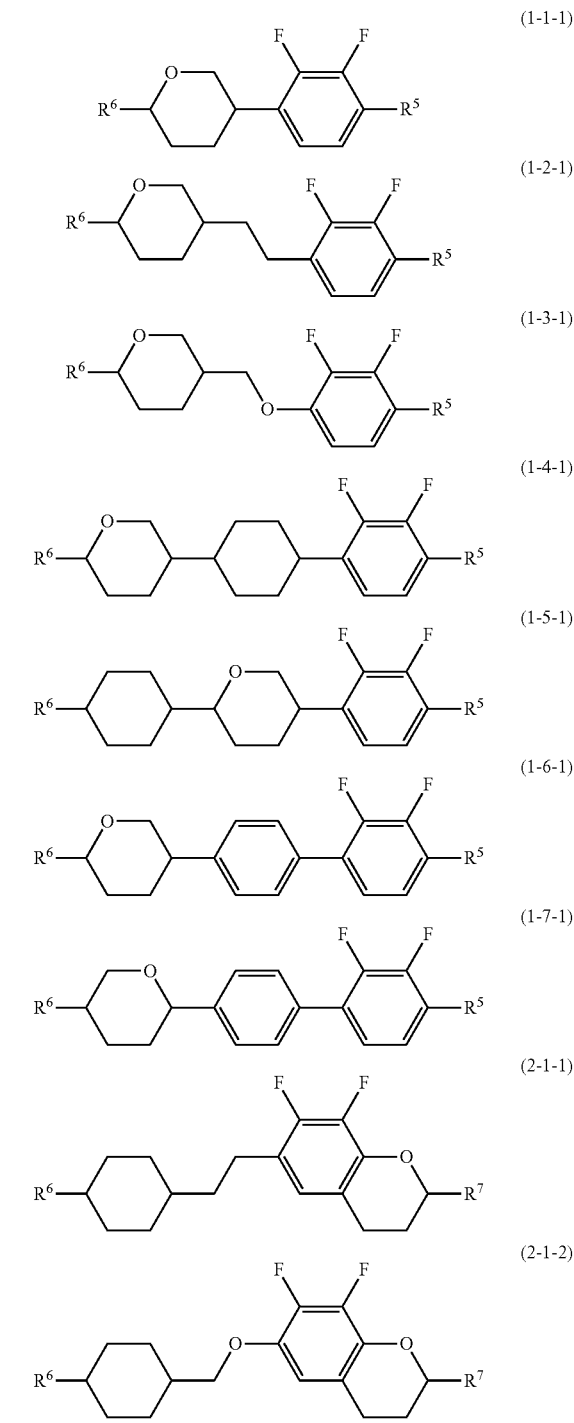

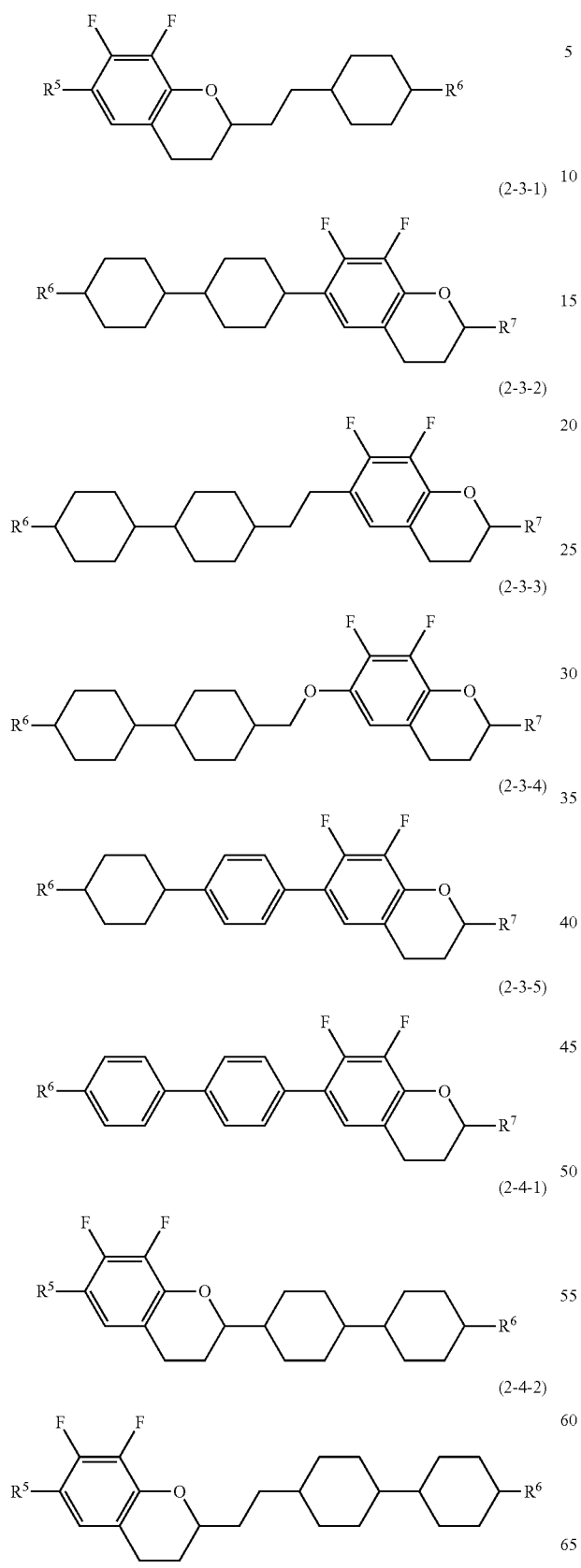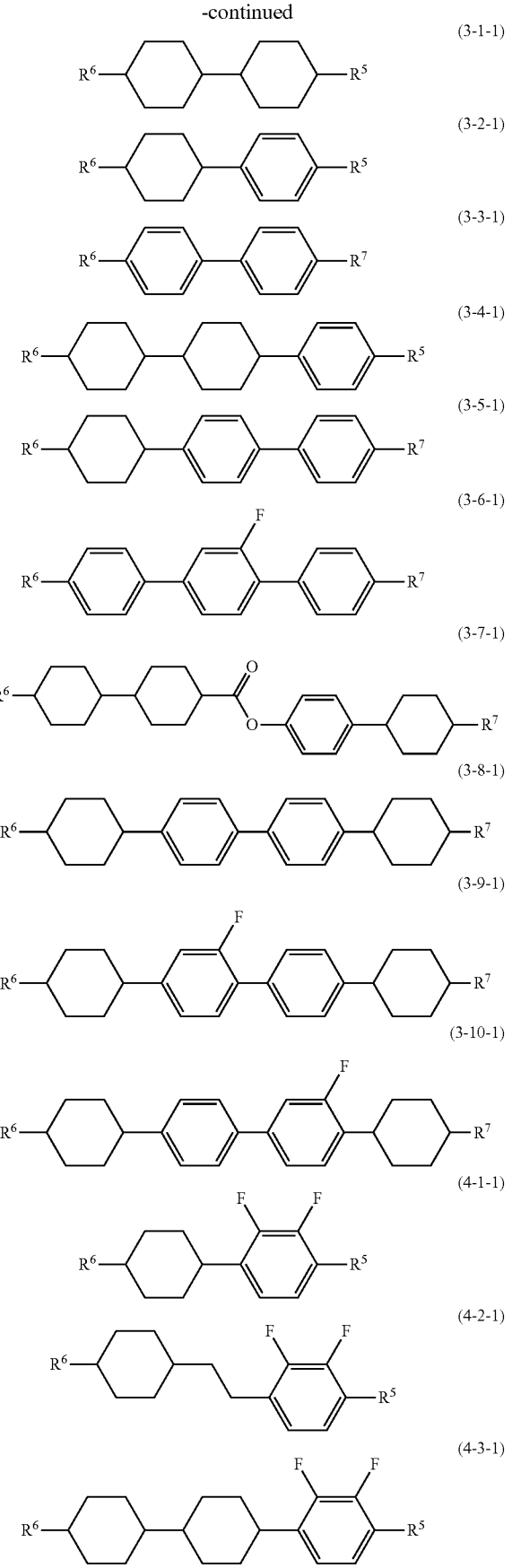

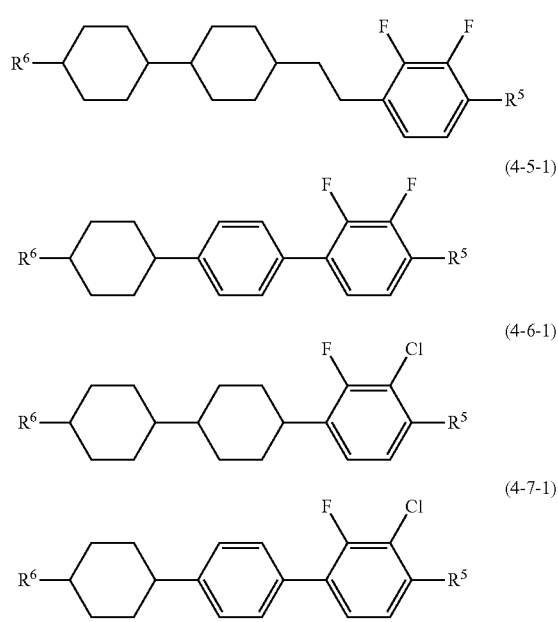

(4-4-1)

(4-5-1)

(4-6-1)

(4-7-1)

Sixth, additives capable of being mixed with the composition will be explained. The additives include an optically active compound, an antioxidant, an ultraviolet light absorbent, a coloring matter, an antifoaming agent, a polymerizable compound, a polymerization initiator and so forth. An optically active compound is mixed in the composition for inducing a helical structure of liquid crystal to provide a twist angle. Examples of the optically active compound include the compounds (5-1) to (5-4) below. A desirable ratio of the optically active compound is 5% by weight or less, and more desirable ratio is from 0.01% by weight to 2% by weight.

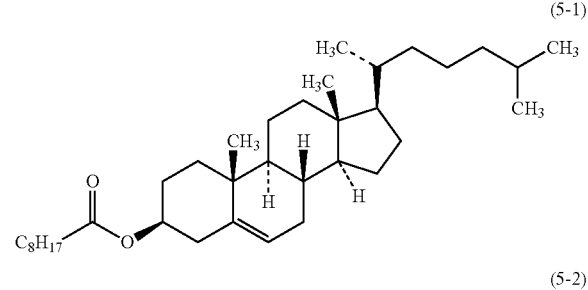

(5-1)

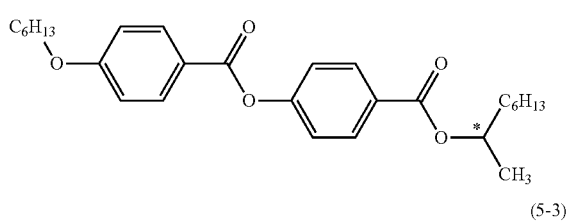

(5-2)

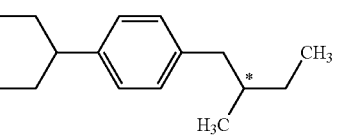

(5-3)

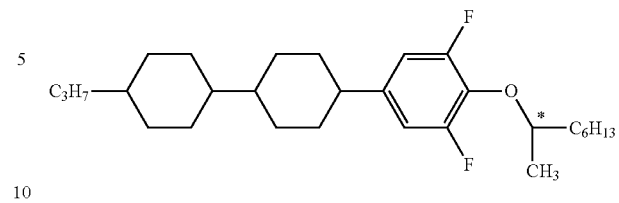

(5-4)

An antioxidant is mixed with the composition in order to avoid a decrease in specific resistance caused by heating in the air or to maintain a large voltage holding ratio at room temperature and also at high temperature even after the device has been used for a long time.

Preferred examples of the antioxidant include the compound (6):

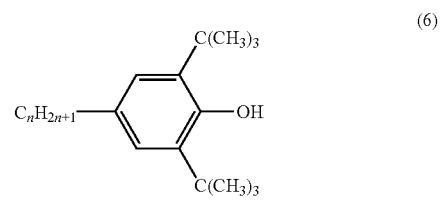

(6)

wherein n is an integer from 1 to 9. In the compound (6), desirable n is 1, 3, 5, 7, or 9. More desirable n is 1 or 7. When n is 1, the compound (6) has a large volatility, and is effective in preventing the decrease of specific resistance caused by heating in the air. When n is 7, the compound (6) has a small volatility, and is effective in maintaining a large voltage holding ratio at room temperature and also at high temperature even after the device has been used for a long time. A desirable ratio of the antioxidant is 50 ppm or more in order to obtain the advantages thereof and is 600 ppm or less in order to prevent the maximum temperature from being decreased and to prevent the minimum temperature from being increased. A more desirable ratio is from 100 ppm to 300 ppm.

Preferred examples of the ultraviolet light absorbent include a benzophenone derivative, a benzoate derivative and a triazole derivative. A light stabilizer having steric hindrance such as an amine is also desirable. A desirable ratio of the absorbent and the stabilizer is 50 ppm or more for obtaining the advantages thereof and is 10,000 ppm or less for preventing the maximum temperature from being decreased and preventing the minimum temperature from being increased. A more desirable ratio thereof ranges from 100 ppm to 10,000 ppm.

A dichroic dye such as an azo dye or an anthraquinone dye is mixed with the composition to suit for a device of a guest host (GH) mode. A desirable ratio of the dye ranges from 0.01% by weight to 10% by weight. An antifoaming agent such as dimethyl silicone oil or methylphenyl silicone oil is mixed with the composition for preventing foaming from occurring. A desirable ratio of the antifoaming agent is 1 ppm or more for obtaining the advantages thereof and is 1,000 ppm or less for preventing display failure from occurring. A more desirable ratio thereof ranges from 1 ppm to 500 ppm.

A polymerizable compound is mixed with the composition for applying the composition to a device having a PSA (polymer sustained alignment) mode. Preferred examples of the polymerizable compound include compounds having a polymerizable group, such as acrylate, methacrylate, vinyl, vinyloxy, propenyl ether, vinylketone, epoxy such as oxirane, oxetane, and so forth. Particularly preferred examples thereof include derivatives of acrylate or methacrylate. A desirable ratio of the polymerizable group is from 0.05% by weight or more for obtaining the advantages thereof, and is 10% by weight or less for preventing display failure from occurring. A more desirable ratio is from 0.1% by weight to 2% by weight. The polymerizable compound is polymerized preferably in the presence of a suitable initiator, such as a photopolymerization initiator and so forth, under radiation of ultraviolet light. Suitable conditions for polymerization and a suitable type and a suitable amount of the initiator have been known by a skilled person in the art and are disclosed in literatures. Examples of the photopolymerization initiator suitable for radical polymerization include Irgacure 651 (trade name), Irgacure 184 (trade name) and Darocure 1173 (trade name), all produced by Ciba Japan K.K. The polymerizable compound preferably contains a photopolymerization initiator in an amount of from 0.1% by weight to 5% by weight, and particularly preferably contains a photopolymerization initiator in an amount of from 1% by weight to 3% by weight.

Seventh, the preparation methods of the component compounds will be explained. These compounds can be prepared by known methods. The preparation method will be exemplified below. The compound (1-2-2) is synthesized by the method disclosed in JP 2000-008040. The compound (2-2-1) is synthesized by the method disclosed in JP 2005-35986. The compounds (3-1-1) and (3-4-1) are synthesized by the method disclosed in JP H4-30382 A/1992. The compounds (4-1-1) and (4-3-1) are synthesized by the method disclosed in JP H2-503441 A/1990. The antioxidant is commercially available. The compound (6), wherein n is 1, is available, for example, from Sigma-Aldrich, Inc. The compound (6), wherein n is 7, and so forth are prepared by the method disclosed in U.S. Pat. No. 3,660,505.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. The compositions of the invention mainly have a minimum temperature of $-10°$ C. or less, a maximum temperature of $70°$ C. or more, and an optical anisotropy of 0.07 to 0.20. The device containing the composition has a large voltage holding ratio. The composition is suitable for an AM device. The composition is suitable especially for an AM device of a transmission type. The composition having an optical anisotropy of 0.08 to 0.25 may be prepared by controlling ratios of the component compounds or by mixing other liquid crystal compounds. The composition can be used as a composition having a nematic phase and as an optically active composition by adding an optically active compound.

The composition can be used for an AM device. It can be also used for a PM device. The composition can be also used for an AM device and a PM device having a mode such as PC, TN, STN, ECB, OCB, IPS, VA, PSA and so forth. It is especially desirable to use the composition for an AM device having an IPS mode or VA mode. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition.

EXAMPLES

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. That is: extrapolated value=(value measured−0.85×value for mother liquid crystals)/0.15. When a smectic phase (or crystals) separated out at this ratio at $25°$ C., a ratio of the compound to mother liquid crystals was changed step by step in the order of (10% by weight/90% by weight), (5% by weight/95% by weight) and (1% by weight/99% by weight), respectively. Values for a maximum temperature, optical anisotropy, viscosity, and dielectric anisotropy of the compound were obtained by the extrapolation.

The component of the mother liquid crystals is as shown below. The ratio of the component is expressed by weight %.

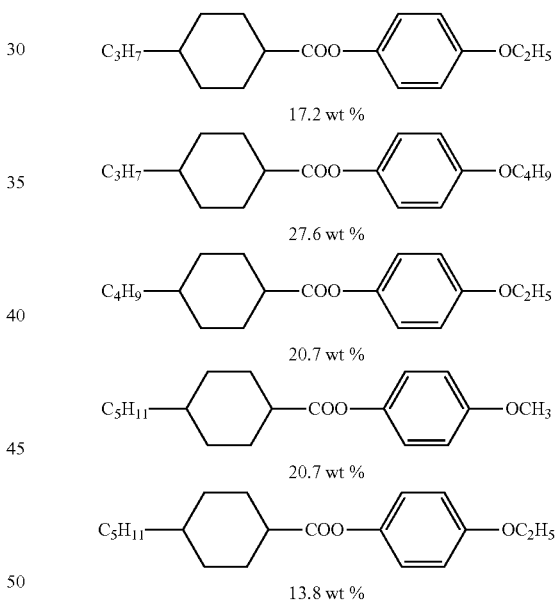

Measurement of the characteristics was carried out according to the following methods. Most methods are described in the Standard of Electronic Industries Association of Japan, EIAJ•ED-2521A or those with some modifications.

Maximum Temperature of a Nematic Phase (NI; ° C.): A sample was placed on a hot plate in a melting point apparatus equipped with a polarizing microscope and was heated at the rate of $1°$ C. per minute. A temperature was measured when part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of $0°$ C., $-10°$ C., $-20°$ C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; measured at 20° C.; mPa·s): Viscosity was measured by means of an E-type viscometer.

Optical Anisotropy (Δn; measured at 25° C.): Measurement was carried out with an Abbe refractometer mounting a polarizing plate on an ocular using light at a wavelength of 589 nm. The surface of a main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of optical anisotropy was calculated from the equation: Δn=n∥−n⊥.

Dielectric Anisotropy (Δ∈; measured at 25° C.): A sample having a nematic phase was put in a TN device having a distance between two glass plates (cell gap) of 9 μm and a twist angle of 80°. Sine waves (10 V, 1 kHz) were impressed onto the device, and a dielectric constant (∈∥) in a major axis direction of a liquid crystal molecule was measured after 2 seconds. Sine waves (0.5 V, 1 kHz) were impressed onto the device and a dielectric constant (∈⊥) in a minor axis direction of a liquid crystal molecule was measured after 2 seconds. A value of a dielectric anisotropy was calculated from the equation: Δ∈=∈∥−∈⊥.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a VA device of a normally black mode, in which a cell gap between two glass plates was 4 μm, and a rubbing direction was anti parallel, and then the device was sealed with an adhesive. The voltage to be applied onto the device (60 Hz, rectangular waves) was increased stepwise by 0.02 V starting from 0 V up to 20 V. During the stepwise increasing, the device was irradiated with light in a perpendicular direction, and an amount of the light passing through the device was measured. A voltage-transmission curve was prepared, in which a maximum amount of a light corresponded to 100% transmittance, a minimum amount of a light corresponded to 0% transmittance. The threshold voltage is a value at 10% transmittance.

Voltage Holding Ratio (VHR-1; measured at 25° C.; %): A TN device used for measurement had a polyimide-alignment film and the cell gap between two glass plates was 5 μm. A sample was poured into the device, and then the device was sealed with an adhesive polymerized by the irradiation of ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-2; measured at 80° C.; %): A TN device used for measurement had a polyimide-alignment film and the cell gap between two glass plates was 5 μm. A sample was poured into the device, and then the device was sealed with an adhesive polymerized by the irradiation of ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having a large VHR-3 has a large stability to ultraviolet light. A TN device used for measurement had a polyimide-alignment film and the cell gap was 5 μm. A sample was poured into the device, and then the device was irradiated with light for 20 minutes. The light source was a super-high pressure mercury lamp USH-500D (made by Ushio, Inc.), and the distance between the device and the light source was 20 cm. In measurement of VHR-3, decreasing voltage was measured for 16.7 milliseconds. The VHR-3 is desirably 90% or more, and more desirably 95% or more.

Voltage Holding Ratio (VHR-4; measured at 25° C.; %): A voltage holding ratio was measured after heating a TN device having a sample poured therein in a constant-temperature chamber at 80° C. for 500 hours to evaluate stability to heat. A composition having a large VHR-4 has a large stability to heat. In measurement of VHR-4, decreasing voltage was measured for 16.7 milliseconds.

Response Time (τ; measured at 25° C.; millisecond): Measurement was carried out with an LCD Evaluation System Model LCD-5100 made by Otsuka Electronics Co., Ltd. The light source was a halogen lamp. The low-pass filter was set at 5 kHz. A sample was poured into a TN device of a normally white mode, in which the cell gap between two glass plates was 5.0 μm, and a twist angle was 80°. Rectangular waves (60 Hz, 5 V, 0.5 second) were impressed to the device. During impressing, the device was irradiated with light in a perpendicular direction, and the amount of light passing through the device was measured. A maximum amount of light corresponds to 100% transmittance, and a minimum amount of light corresponds to 0% transmittance. Rise time (τr; millisecond) is the time required for a change in transmittance from 90% to 10%. Fall time (τf; millisecond) is the time required for a change in transmittance from 10% to 90%. Response time is the sum of the rise time and the fall time thus obtained.

Specific Resistance (ρ; measured at 25° C.; Ωcm): A sample of 1.0 ml was poured into a vessel equipped with electrodes. The vessel was impressed with DC voltage (10 V) and a direct current was measured after 10 seconds. Specific resistance was calculated from the following equation: Specific resistance=(voltage×electric capacitance of vessel)/(direct current×dielectric constant in a vacuum).

Gas Chromatographic Analysis: A Gas Chromatograph Model GC-14B made by Shimadzu Corporation was used for measurement. The carrier gas was helium (2 ml per minute). An evaporator and a detector (FID) were set up at 280° C. and 300° C., respectively. A capillary column DB-1 (length 30 m, bore 0.32 mm, film thickness 0.25 μm; dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 μl of the solution was injected into the evaporator. A recorder used was a Chromatopac Model C-R5A made by Shimadzu Corporation or its equivalent. The resulting gas chromatogram showed the retention time of a peak and a peak area corresponding to the component compound.

Solvents for diluting the sample may also be chloroform, hexane, and so forth. The following capillary column may also be used: HP-1 made by Agilent Technologies, Inc. (length 30 m, bore 0.32 mm, film thickness 0.25 μm), Rtx-1 made by Restek Corporation (length 30 m, bore 0.32 mm, film thickness 0.25 μm), and BP-1 made by SGE International Pty. Ltd. (length 30 m, bore 0.32 mm, film thickness 0.25 μm). In order to prevent compound peaks from overlapping, a capillary column CBP1-M50-025 (length 50 m, bore 0.25 mm, film thickness 0.25 μm) made by Shimadzu Corporation may be used.

The ratio of liquid crystal compounds contained in the composition may be calculated by the following method. The liquid crystal compounds can be detected with a gas chromatograph. The area ratio of each peak in the gas chromatogram corresponds to the ratio (number of moles) of liquid crystal compounds. When the above capillary columns are used, the correction coefficient of each liquid crystal compound may be regarded as 1. Therefore, the ratio of liquid crystal compounds (% by weight) is calculated from the area ratio of each peak.

The invention will be explained in detail by way of Examples. The invention is not limited by the Examples described below. The compounds described in Comparative Examples and the Examples are expressed by the symbols according to the definition in Table 3. In Table 3, the configuration of 1,4-cyclohexylene is trans. The parenthesized numbers next to the symbolized compounds in the Examples correspond to the numbers of the desirable compounds. The symbol (-) means other liquid crystal compound. The ratios (percentage) of liquid crystal compounds are expressed by percentage by weight (% by weight) based on the total weight of liquid crystal compositions, and the liquid crystal compositions contain impurities in addition to the liquid crystal compounds. Last, the characteristics of the compositions are summarized.

TABLE 3

| Method of Description of Compound using Symbols $R\text{-}(A_1)\text{-}Z_1\text{-}...\text{-}Z_n\text{-}(A_n)\text{-}R'$ | |
|---|---|
| 1) Left Terminal Group R- | Symbol |
| $C_nH_{2n+1}$— | n- |
| $C_nH_{2n+1}O$— | nO— |
| $CH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| 2) Right Terminal Group —F | Symbol |
| —$C_nH_{2n+1}$ | -n |
| —$OC_nH_{2n+1}$ | —On |
| —CH=$CH_2$ | -V |
| —CH=CH—$C_nH_{2n+1}$ | -Vn |
| —$C_nH_{2n}$—CH=$CH_2$ | -nV |
| —CH=$CF_2$ | -VFF |
| —$COOCH_3$ | -EMe |
| 3) Bonding Group —Zn— | Symbol |
| —$C_2H_4$— | 2 |
| —COO— | E |
| —CH=CH— | V |
| —C≡C— | T |
| —$CF_2O$— | X |
| —$CH_2O$— | 1O |
| —$SiH_2$— | Si |

TABLE 3-continued

| 4) Ring Structure -An- | Symbol |
|---|---|
| (cyclohexylene) | H |
| (tetrahydropyran, O top) | Dh |
| (tetrahydropyran, O side) | dh |
| (phenylene) | B |
| (fluorophenylene) | B(F) |
| (2-fluorophenylene) | B(2F) |
| (2,3-difluorophenylene) | B(2F,3F) |
| (2-F,3-Cl phenylene) | B(2F,3Cl) |
| (2-Cl,3-F phenylene) | B(2Cl,3F) |
| (2,5-difluorophenylene) | B(2F,5F) |
| (chromane 7F,8F) | Cro(7F,8F) |

TABLE 3-continued

5) Example of Description

Example 1 V2-BB(F)B-1

CH$_2$=CHCH$_2$CH$_2$—[ring]—[ring with F]—[ring]—CH$_3$

Example 2 3-DhB(2F,3F)-O2

C$_3$H$_7$—[pyran ring with O]—[ring with 2F,3F]—OC$_2$H$_5$

Example 3 3-HHB-1

C$_3$H$_7$—[cyclohexyl]—[cyclohexyl]—[phenyl]—CH$_3$

Example 4 5-HBB(F)B-3

C$_5$H$_{11}$—[cyclohexyl]—[phenyl]—[phenyl with F]—[phenyl]—C$_3$H$_7$

Comparative Example 1

Example 19 was selected from the compositions disclosed in JP 2001-262145 A. The basis is that the composition contains compounds (1-5-1), (3-1-1), (3-2-1) and (3-4-1), and has the smallest viscosity. The components and characteristics of the composition were as follows.

| | | |
|---|---|---|
| 3-HDhB(2F,3F)-O2 | (1-5-1) | 6% |
| 5-HDhB(2F,3F)-O2 | (1-5-1) | 6% |
| 2-HH1SiB(2F,3F)-O2 | (—) | 6% |
| 3-HH1SiB(2F,3F)-O2 | (—) | 6% |
| 2-HH-3 | (3-1-1) | 6% |
| 3-HH-4 | (3-1-1) | 10% |
| 3-HB-O2 | (3-2-1) | 16% |
| 3-HB-O4 | (3-2-1) | 4% |
| 3-HHB-1 | (3-4-1) | 8% |
| 3-HHB-O1 | (3-4-1) | 5% |
| 3-HHB-3 | (3-4-1) | 8% |
| 2-HH-EMe | (—) | 4% |
| 3-HH-EMe | (—) | 15% |

NI = 80.4° C.; Tc ≦ −20° C.; Δn = 0.077; η = 14.3 mPa · s; Δε = −1.4.

Comparative Example 2

Example 12 was selected from the compositions disclosed in JP 2001-115161 A. The basis is that the composition contains compounds (1-1-1), (1-2-1), (1-5-1), (3-1-1), (3-2-1) and (3-4-1), and has the smallest η. The components and characteristics of the composition were as follows.

| | | |
|---|---|---|
| 3-DhB(2F,3F)-O2 | (1-1-1) | 3% |
| 5-DhB(2F,3F)-O2 | (1-1-1) | 6% |
| 3-Dh2B(2F,3F)-O2 | (1-2-1) | 3% |
| 3-HDhB(2F,3F)-O1 | (1-5-1) | 7% |
| 3-HDhB(2F,3F)-O2 | (1-5-1) | 7% |
| 3-HH-4 | (3-1-1) | 12% |
| 3-HB-O2 | (3-2-1) | 16% |
| 3-HB-O4 | (3-2-1) | 8% |
| 3-HHB-1 | (3-4-1) | 7% |
| 3-HHB-O1 | (3-4-1) | 5% |
| 3-HHB-3 | (3-4-1) | 10% |
| 2-HH-EMe | (—) | 6% |
| 3-HH-EMe | (—) | 10% |

NI = 72.0° C.; Tc ≦ −20° C.; Δn = 0.076; η = 16.2 mPa · s; Δε = −1.2.

Example 1

| | | |
|---|---|---|
| 3-HDhB(2F,3F)-O2 | (1-5-1) | 11% |
| 5-HDhB(2F,3F)-O2 | (1-5-1) | 6% |
| 3-dhBB(2F,3F)-O2 | (1-7-1) | 10% |
| 4-dhBB(2F,3F)-O2 | (1-7-1) | 6% |
| 5-dhBB(2F,3F)-O2 | (1-7-1) | 8% |
| 3-HH1OCro(7F,8F)-5 | (2-3-3) | 5% |
| V-HH-3 | (3-1-1) | 45% |
| V-HB(2F,3F)-O2 | (4-1-1) | 9% |

NI = 81.8° C.; Tc ≦ −20° C.; Δn = 0.089; η = 13.3 mPa · s; Δε = −3.0; Vth = 2.38 V; VHR-1 = 99.2%; VHR-2 = 98.2%; VHR-3 = 98.1%.

Example 2

| | | |
|---|---|---|
| 3-DhB(2F,3F)-O2 | (1-1-1) | 5% |
| 5-DhB(2F,3F)-O2 | (1-1-1) | 8% |
| 3-HH2Cro(7F,8F)-5 | (2-3-2) | 3% |
| 3-HBCro(7F,8F)-5 | (2-3-4) | 3% |
| 3-BBCro(7F,8F)-5 | (2-3-5) | 3% |
| 2-HH-3 | (3-1-1) | 5% |
| V-HH-3 | (3-1-1) | 30% |
| V-HHB-1 | (3-4-1) | 5% |
| 5-HBB(F)B-2 | (3-10-1) | 4% |
| 5-HBB(F)B-3 | (3-10-1) | 4% |
| 3-HB(2F,3F)-O2 | (4-1-1) | 10% |
| 5-HB(2F,3F)-O2 | (4-1-1) | 10% |
| 3-HHB(2F,3F)-O2 | (4-3-1) | 10% |

NI = 70.5° C.; Tc ≦ −20° C.; Δn = 0.090; η = 11.9 mPa · s; Δε = −2.7; VHR-1 = 99.1%; VHR-2 = 98.1%; VHR-3 = 98.0%.

Example 3

| | | |
|---|---|---|
| 3-Dh2B(2F,3F)-O2 | (1-2-1) | 10% |
| 3-Dh1OB(2F,3F)-O2 | (1-3-1) | 5% |
| 3-H2Cro(7F,8F)-5 | (2-1-1) | 3% |
| 3-H1OCro(7F,8F)-5 | (2-1-2) | 4% |
| 3-HHCro(7F,8F)-5 | (2-3-1) | 3% |
| V-HH-3 | (3-1-1) | 32% |
| 1V-HH-3 | (3-1-1) | 7% |
| 3-HB-O2 | (3-2-1) | 3% |
| 1V-HBB-2 | (3-5-1) | 4% |
| 2-BB(F)B-3 | (3-6-1) | 5% |
| 3-HBB(2F,3F)-O2 | (4-5-1) | 10% |
| 4-HBB(2F,3F)-O2 | (4-5-1) | 6% |
| 5-HBB(2F,3F)-O2 | (4-5-1) | 8% |

NI = 73.9° C.; Tc ≦ −20° C.; Δn = 0.100; η = 12.7 mPa · s; Δε = −2.6; VHR-1 = 99.1%; VHR-2 = 98.1%; VHR-3 = 98.1%.

Example 4

| | | |
|---|---|---|
| 3-DhhB(2F,3F)-O2 | (1-4-1) | 10% |
| 5-DhhB(2F,3F)-O2 | (1-4-1) | 5% |
| 3-DhBB(2F,3F)-O2 | (1-6-1) | 5% |
| 3-H2Cro(7F,8F)-3 | (2-1-1) | 3% |
| 3-H2Cro(7F,8F)-5 | (2-1-1) | 3% |
| 2O-Cro(7F,8F)HH-5 | (2-4-1) | 3% |
| 3-Cro(7F,8F)2HH-5 | (2-4-1) | 3% |
| V-HH-3 | (3-1-1) | 40% |
| 1-BB(F)B-2V | (3-6-1) | 5% |
| 3-HHEBH-5 | (3-7-1) | 3% |
| 3-HB(2F,3F)-O2 | (4-1-1) | 10% |
| 3-H2B(2F,3F)-O2 | (4-2-1) | 10% |

NI = 70.6° C.; Tc ≦ −20° C.; Δn = 0.083; η = 13.2 mPa·s; Δε = −2.9; VHR-1 = 99.0%; VHR-2 = 98.1%; VHR-3 = 98.0%.

Example 5

| | | |
|---|---|---|
| 3-HDhB(2F,3F)-O2 | (1-5-1) | 12% |
| 5-HDhB(2F,3F)-O2 | (1-5-1) | 7% |
| 3-dhBB(2F,3F)-O2 | (1-7-1) | 10% |
| 5-dhBB(2F,3F)-O2 | (1-7-1) | 6% |
| 2-Cro(7F,8F)2H-3 | (2-2-1) | 3% |
| 2O-Cro(7F,8F)2H-3 | (2-2-1) | 3% |
| 3-HH1OCro(7F,8F)-5 | (2-3-3) | 5% |
| V-HH-3 | (3-1-1) | 35% |
| 1V-HH-3 | (3-1-1) | 8% |
| V2-BB-1 | (3-3-1) | 6% |
| V2-HHB-1 | (3-4-1) | 5% |

NI = 84.1° C.; Tc ≦ −20° C.; Δn = 0.090; η = 12.8 mPa·s; Δε = −2.4; VHR-1 = 99.2%; VHR-2 = 98.2%; VHR-3 = 98.1%.

Example 6

| | | |
|---|---|---|
| 3-HDhB(2F,3F)-O2 | (1-5-1) | 10% |
| 3-H2Cro(7F,8F)-5 | (2-1-1) | 5% |
| 3-HH-O1 | (3-1-1) | 3% |
| V-HH-3 | (3-1-1) | 35% |
| V-HH-5 | (3-1-1) | 12% |
| 5-HBBH-3 | (3-8-1) | 3% |
| 5-HB(F)BH-3 | (3-9-1) | 3% |
| V-HHB(2F,3F)-O2 | (4-3-1) | 5% |
| 2-HBB(2F,3F)-O2 | (4-5-1) | 4% |
| 3-HBB(2F,3F)-O2 | (4-5-1) | 16% |
| 3-HHB(2F,3Cl)-O2 | (4-6-1) | 4% |

NI = 96.6° C.; Tc ≦ −20° C.; Δn = 0.090; η = 11.6 mPa·s; Δε = −2.3; VHR-1 = 99.2%; VHR-2 = 98.2%; VHR-3 = 98.2%.

Example 7

| | | |
|---|---|---|
| 3-HDhB(2F,3F)-O2 | (1-5-1) | 5% |
| 3-HH1OCro(7F,8F)-5 | (2-3-3) | 6% |
| 3-HHEH-5 | (3) | 3% |
| 3-HH-VFF | (3-1) | 3% |
| V-HH-3 | (3-1-1) | 30% |
| 1V2-BB-1 | (3-3-1) | 4% |
| V2-BB(F)B-1 | (3-6-1) | 5% |
| 3-HHEBH-5 | (3-7-1) | 3% |
| 3-HB(2F,3F)-O2 | (4-1-1) | 14% |
| 5-HB(2F,3F)-O2 | (4-1-1) | 13% |
| 3-HH2B(2F,3F)-O2 | (4-4-1) | 9% |
| 5-HBB(2F,3Cl)-O2 | (4-7-1) | 5% |

NI = 72.5° C.; Tc ≦ −20° C.; Δn = 0.087; η = 13.2 mPa·s; Δε = −2.1; VHR-1 = 99.1%; VHR-2 = 98.1%; VHR-3 = 98.0%.

Example 8

| | | |
|---|---|---|
| 3-HDhB(2F,3F)-O2 | (1-5-1) | 10% |
| 3-DhhB(2F,3F)-O2 | (1-4-1) | 6% |
| 3-HH1OCro(7F,8F)-5 | (2-3-3) | 5% |
| 3-BB(2F,5F)B-2 | (3) | 3% |
| V-HH-3 | (3-1-1) | 35% |
| 1V-HH-3 | (3-1-1) | 6% |
| 3-HHB-O1 | (3-4-1) | 3% |
| 3-HB(2F,3F)-O2 | (4-1-1) | 10% |
| 5-HB(2F,3F)-O2 | (4-1-1) | 10% |
| 5-HBB(2F,3Cl)-O2 | (4-7-1) | 8% |
| 1O1-HBBH-5 | (—) | 4% |

NI = 80.8° C.; Tc ≦ −20° C.; Δn = 0.086; η = 12.6 mPa·s; Δε = −2.6; VHR-1 = 99.0%; VHR-2 = 98.1%; VHR-3 = 98.0%.

Example 9

| | | |
|---|---|---|
| 2-HDhB(2F,3F)-O2 | (1-5-1) | 3% |
| 3-HDhB(2F,3F)-O2 | (1-5-1) | 5% |
| 3-HH1OCro(7F,8F)-5 | (2-3-3) | 5% |
| V-HH-3 | (3-1-1) | 14% |
| 2-HH-3 | (3-1-1) | 22% |
| 3-HH-4 | (3-1-1) | 2% |
| 3-HHB-1 | (3-4-1) | 2% |
| 5-HBB(F)B-2 | (3-10-1) | 6% |
| 5-HBB(F)B-3 | (3-10-1) | 6% |
| 3-H2B(2F,3F)-O2 | (4-2-1) | 17% |
| 5-H2B(2F,3F)-O2 | (4-2-1) | 12% |
| 3-HBB(2F,3F)-O2 | (4-5-1) | 6% |

NI = 73.5° C.; Tc ≦ −20° C.; Δn = 0.088; η = 13.0 mPa·s; Δε = −2.7; VHR-1 = 99.1%; VHR-2 = 98.2%; VHR-3 = 98.0%.

Example 10

| | | |
|---|---|---|
| 3-HDhB(2F,3F)-O2 | (1-5-1) | 4% |
| 5-HDhB(2F,3F)-O2 | (1-5-1) | 3% |
| 3-HH1OCro(7F,8F)-5 | (2-3-3) | 5% |
| V-HH-3 | (3-1-1) | 5% |
| 2-HH-3 | (3-1-1) | 25% |
| 3-HH-4 | (3-1-1) | 7% |
| 1V-HH-3 | (3-1-1) | 3% |
| 3-HHB-1 | (3-4-1) | 2% |
| 5-HBB(F)B-2 | (3-10-1) | 6% |
| 5-HBB(F)B-3 | (3-10-1) | 6% |
| 3-H2B(2F,3F)-O2 | (4-2-1) | 17% |
| 5-H2B(2F,3F)-O2 | (4-2-1) | 14% |
| 3-HBB(2F,3F)-O2 | (4-5-1) | 3% |

NI = 71.9° C.; Tc ≦ −20° C.; Δn = 0.084; η = 13.0 mPa·s; Δε = −2.6; VHR-1 = 99.1%; VHR-2 = 98.1%; VHR-3 = 98.1%.

Example 11

| | | |
|---|---|---|
| 3-HDhB(2F,3F)-O2 | (1-5-1) | 7% |
| 3-HH1OCro(7F,8F)-5 | (2-3-3) | 5% |
| V-HH-3 | (3-1-1) | 12% |
| 2-HH-3 | (3-1-1) | 18% |
| 1V-HH-3 | (3-1-1) | 5% |
| 3-HHB-1 | (3-4-1) | 5% |
| 3-HHB-O1 | (3-4-1) | 3% |
| 3-HHEBH-3 | (3-7-1) | 3% |
| 5-HBB(F)B-2 | (3-10-1) | 6% |
| 3-H2B(2F,3F)-O2 | (4-2-1) | 17% |
| 5-H2B(2F,3F)-O2 | (4-2-1) | 16% |
| 3-HBB(2F,3F)-O2 | (4-5-1) | 3% |

NI = 72.7° C.; Tc ≦ −20° C.; Δn = 0.081; η = 12.9 mPa·s; Δε = −2.7; VHR-1 = 99.1%; VHR-2 = 98.1%; VHR-3 = 98.0%.

Example 12

| | | |
|---|---|---|
| 3-HDhB(2F,3F)-O2 | (1-5-1) | 4% |
| 5-HDhB(2F,3F)-O2 | (1-5-1) | 4% |
| 4O-Cro(7F,8F)H-3 | (2-2) | 3% |
| 3-HH1OCro(7F,8F)-5 | (2-3-3) | 3% |
| V-HH-3 | (3-1-1) | 30% |
| 2-HH-3 | (3-1-1) | 10% |
| 1V-HH-3 | (3-1-1) | 7% |
| 3-HHEBH-3 | (3-7-1) | 5% |
| 3-HHEBH-4 | (3-7-1) | 2% |
| 3-HHEBH-5 | (3-7-1) | 3% |
| 5-HBB(F)B-3 | (3-10-1) | 3% |
| 5-HB(2F,3F)-O2 | (4-1-1) | 3% |
| V-HB(2F,3F)-O4 | (4-1-1) | 3% |
| 3-H2B(2F,3F)-O2 | (4-2-1) | 16% |
| 2-HBB(2F,3F)-O2 | (4-5-1) | 4% |

NI = 71.6° C.; Tc ≦ −20° C.; Δn = 0.072; η = 12.5 mPa · s; Δε = −3.0; VHR-1 = 99.0%; VHR-2 = 98.0%; VHR-3 = 98.0%.

Example 13

| | | |
|---|---|---|
| 3-HDhB(2F,3F)-O2 | (1-5-1) | 8% |
| 4O-Cro(7F,8F)H-5 | (2-2) | 4% |
| 3-HH1OCro(7F,8F)-5 | (2-3-3) | 3% |
| V-HH-3 | (3-1-1) | 25% |
| 2-HH-3 | (3-1-1) | 10% |
| 1V-HH-3 | (3-1-1) | 8% |
| V-HH-5 | (3-1-1) | 5% |
| 3-HHB-3 | (3-4-1) | 5% |
| 3-HHEBH-3 | (3-7-1) | 4% |
| 5-HBB(F)B-2 | (3-10-1) | 3% |
| 5-HBB(F)B-3 | (3-10-1) | 2% |
| 5-HB(2F,3F)-O2 | (4-1-1) | 3% |
| 5-H2B(2F,3F)-O2 | (4-2-1) | 16% |
| 5-HH2B(2F,3F)-O2 | (4-4-1) | 4% |

NI = 75.0° C.; Tc ≦ −20° C.; Δn = 0.072; η = 12.7 mPa · s; Δε = −2.7; VHR-1 = 99.2%; VHR-2 = 98.2%; VHR-3 = 98.1%.

Example 14

| | | |
|---|---|---|
| 3-DhHB(2F,3F)-O2 | (1-4-1) | 3% |
| 5-HDhB(2F,3F)-O2 | (1-5-1) | 3% |
| 5-H1OCro(7F,8F)-5 | (2-1-2) | 3% |
| 3-HH1OCro(7F,8F)-5 | (2-3-3) | 3% |
| V-HH-3 | (3-1-1) | 10% |
| 2-HH-3 | (3-1-1) | 22% |
| V2-BB-1 | (3-3-1) | 8% |
| 3-HHB-1 | (3-4-1) | 5% |
| 3-HHB-3 | (3-4-1) | 4% |
| V-HHB-1 | (3-4-1) | 5% |
| 3-HB(2F,3F)-O2 | (4-1-1) | 5% |
| V-HB(2F,3F)-O2 | (4-1-1) | 5% |
| 3-H2B(2F,3F)-O2 | (4-2-1) | 5% |
| 3-HBB(2F,3F)-O2 | (4-5-1) | 10% |
| 4-HBB(2F,3F)-O2 | (4-5-1) | 9% |

NI = 74.1° C.; Tc ≦ −20° C.; Δn = 0.091; η = 12.7 mPa · s; Δε = −2.6; VHR-1 = 99.3%; VHR-2 = 98.1%; VHR-3 = 98.0%.

Example 15

| | | |
|---|---|---|
| 3-DhHB(2F,3F)-O2 | (1-4-1) | 3% |
| 5-HDhB(2F,3F)-O2 | (1-5-1) | 3% |
| 3-HH1OCro(7F,8F)-5 | (2-3-3) | 5% |
| 2-HH-3 | (3-1-1) | 24% |
| 3-HH-5 | (3-1-1) | 3% |
| 1V-HH-3 | (3-1-1) | 8% |
| 3-HHB-1 | (3-4-1) | 4% |
| 3-HHB-O1 | (3-4-1) | 3% |
| 3-HHB-3 | (3-4-1) | 4% |
| 3-HB(2F,3F)-O2 | (4-1-1) | 15% |
| 5-HB(2F,3F)-O2 | (4-1-1) | 14% |
| 3-HBB(2F,3F)-O2 | (4-5-1) | 10% |
| 5-HBB(2F,3F)-O2 | (4-5-1) | 4% |

NI = 72.3° C.; Tc ≦ −20° C.; Δn = 0.083; η = 12.4 mPa · s; Δε = −3.1; VHR-1 = 99.1%; VHR-2 = 98.0%; VHR-3 = 98.0%.

Example 16

| | | |
|---|---|---|
| 3-DhHB(2F,3F)-O2 | (1-4-1) | 3% |
| 3-HDhB(2F,3F)-O2 | (1-5-1) | 3% |
| 4O-Cro(7F,8F)H-3 | (2-2) | 3% |
| 3-HH1OCro(7F,8F)-5 | (2-3-3) | 3% |
| 2-HH-3 | (3-1-1) | 23% |
| 3-HH-4 | (3-1-1) | 3% |
| 5-HB-O2 | (3-2-1) | 5% |
| 3-HHB-1 | (3-4-1) | 4% |
| 3-HHB-O1 | (3-4-1) | 4% |
| 3-HHB-3 | (3-4-1) | 4% |
| 3-HHEBH-3 | (3-7-1) | 3% |
| 3-HB(2F,3F)-O2 | (4-1-1) | 15% |
| 5-HB(2F,3F)-O2 | (4-1-1) | 14% |
| 3-HBB(2F,3F)-O2 | (4-5-1) | 10% |
| 5-HBB(2F,3F)-O2 | (4-5-1) | 3% |

NI = 74.5° C.; Tc ≦ −20° C.; Δn = 0.084; η = 12.7 mPa · s; Δε = −3.1; VHR-1 = 99.2%; VHR-2 = 98.1%; VHR-3 = 98.0%.

Example 17

| | | |
|---|---|---|
| 3-DhHB(2F,3F)-O2 | (1-4-1) | 5% |
| 3-HDhB(2F,3F)-O2 | (1-5-1) | 4% |
| 3-HH1OCro(7F,8F)-5 | (2-3-3) | 5% |
| V-HH-3 | (3-1-1) | 10% |
| 2-HH-3 | (3-1-1) | 23% |
| 1V-HH-3 | (3-1-1) | 7% |
| 3-HB-O1 | (3-2-1) | 3% |
| V2-BB-1 | (3-3-1) | 7% |
| 3-HHB-O1 | (3-4-1) | 3% |
| 3-HHEBH-3 | (3-7-1) | 3% |
| 5-HBB(F)B-3 | (3-10-1) | 3% |
| 3-HB(2F,3F)-O2 | (4-1-1) | 5% |
| 5-H2B(2F,3F)-O2 | (4-2-1) | 12% |
| 3-HHB(2F,3Cl)-O2 | (4-6-1) | 3% |
| 3-HH2B(2F,3F)-O2 | (4-4-1) | 7% |

NI = 72.7° C.; Tc ≦ −20° C.; Δn = 0.076; η = 12.8 mPa · s; Δε = −2.6; VHR-1 = 99.3%; VHR-2 = 98.2%; VHR-3 = 98.1%.

Example 18

| | | |
|---|---|---|
| 3-HDhB(2F,3F)-O2 | (1-5-1) | 5% |
| 5-HDhB(2F,3F)-O2 | (1-5-1) | 5% |
| 4O-Cro(7F,8F)H-3 | (2-2) | 3% |
| 3-HH1OCro(7F,8F)-5 | (2-3-3) | 3% |
| 2-HH-3 | (3-1-1) | 20% |
| 3-HH-4 | (3-1-1) | 8% |
| 3-HH-O1 | (3-1-1) | 3% |
| 3-HB-O2 | (3-2-1) | 10% |
| 5-HB-O2 | (3-2-1) | 8% |
| 5-HBB(F)B-3 | (3-10-1) | 4% |
| V-HB(2F,3F)-O2 | (4-1-1) | 8% |
| 3-HH2B(2F,3F)-O2 | (4-4-1) | 8% |
| 3-HBB(2F,3F)-O2 | (4-5-1) | 10% |
| 5-HBB(2F,3F)-O2 | (4-5-1) | 5% |

NI = 78.4° C.; Tc ≦ −20° C.; Δn = 0.089; η = 12.8 mPa · s; Δε = −2.7; VHR-1 = 99.3%; VHR-2 = 98.2%; VHR-3 = 98.2%.

Example 19

| | | |
|---|---|---|
| 5-DhHB(2F,3F)-O2 | (1-4-1) | 3% |
| 3-HDhB(2F,3F)-O2 | (1-5-1) | 5% |
| 4O-Cro(7F,8F)H-3 | (2-2) | 3% |
| 3-HH1OCro(7F,8F)-5 | (2-3-3) | 3% |
| V-HH-3 | (3-1-1) | 9% |
| 2-HH-3 | (3-1-1) | 23% |
| 3-HH-4 | (3-1-1) | 5% |
| 3-HB-O2 | (3-2-1) | 8% |
| 3-HHB-1 | (3-4-1) | 3% |
| 5-HBB(F)B-2 | (3-10-1) | 3% |
| V-HB(2F,3F)-O2 | (4-1-1) | 7% |
| V-HB(2F,3F)-O4 | (4-1-1) | 5% |
| 3-HH2B(2F,3F)-O2 | (4-4-1) | 8% |
| 2-HBB(2F,3F)-O2 | (4-5-1) | 5% |
| 3-HBB(2F,3F)-O2 | (4-5-1) | 10% |

NI = 74.8° C.; Tc ≤ −20° C.; Δn = 0.085; η = 12.9 mPa · s; Δε = −2.7; VHR-1 = 99.1%; VHR-2 = 98.1%; VHR-3 = 98.1%.

The compositions of Example 1 to 19 have a negatively large dielectric anisotropy and a small viscosity compared with those of Comparative Example 1 and 2. Thus the liquid crystal composition of the invention has better characteristics than those of the liquid crystal composition according to the patent documents 1 and 2.

What is claimed is:

1. The invention concerns a liquid crystal composition having a negative dielectric anisotropy that includes two components, wherein the first component is at least one compound selected from the group of compounds represented by formula (1), the second component is at least one compound selected from the group of compounds represented by formula (2):

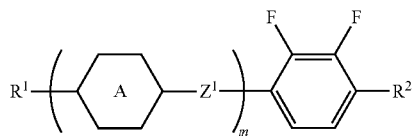

(1)

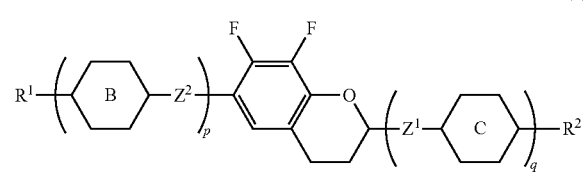

(2)

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently tetrahydropyran-2,5-diyl, 1,4-cyclohexylene or 1,4-phenylene; at least one ring A is tetrahydropyran-2,5-diyl; ring B and ring C are each independently 1,4-cyclohexylene or 1,4-phenylen; $Z^1$ and $Z^2$ are each independently a single bond, ethylene, methyleneoxy or carbonyloxy; and m is 1, 2 or 3, p and q are each independently 0, 1, 2 or 3; and the sum of p and q is 3 or less.

2. The liquid crystal composition according to claim 1, wherein the first component is at least one compound selected from the group of compounds represented by formula (1-1) to (1-7):

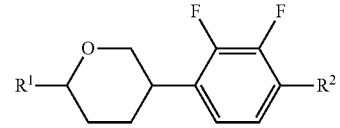

(1-1)

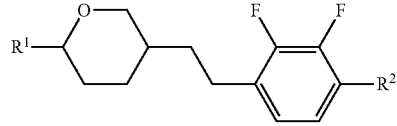

(1-2)

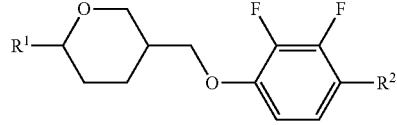

(1-3)

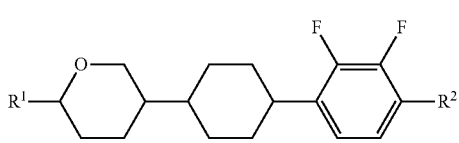

(1-4)

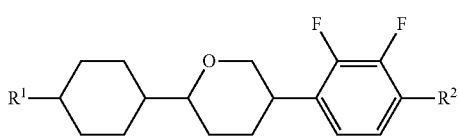

(1-5)

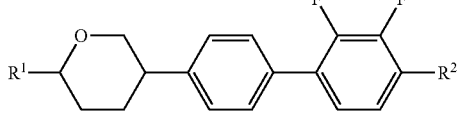

(1-6)

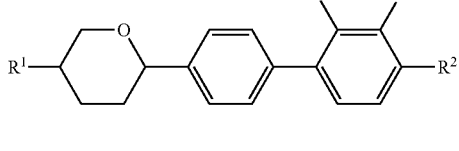

(1-7)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to claim 2, wherein the first component is at least one compound selected from the group of compounds represented by formula (1-1) to (1-3).

4. The liquid crystal composition according to claim 2, wherein the first component is at least one compound selected from the group of compounds represented by formula (1-4) to (1-7).

5. The liquid crystal composition according to claim 2, wherein the first component is a mixture of at least one compound selected from the group of compounds represented by formula (1-1) to (1-3), and at least one compound selected from the group of compounds represented by formula (1-4) to (1-7).

6. The liquid crystal composition according to claim 1, wherein the second component is at least one compound selected from the group of compounds represented by formula (2-1) to (2-4)

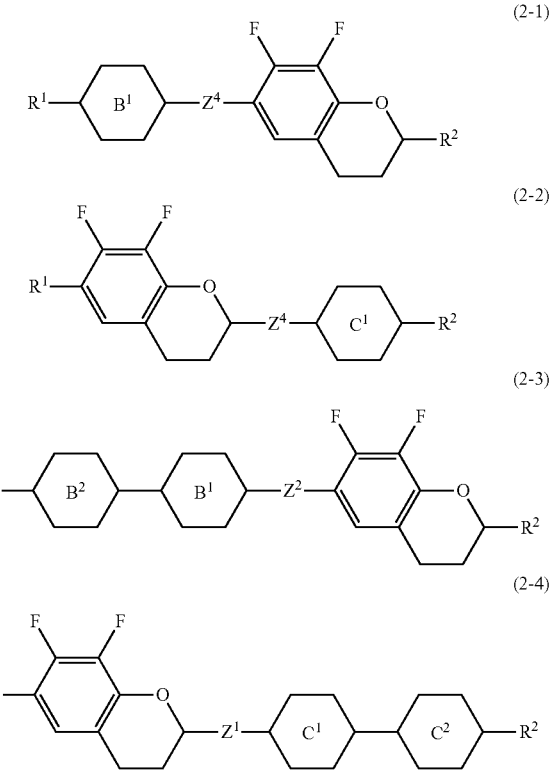

wherein R¹ and R² are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring $B^1$, ring $B^2$, ring $C^1$ and ring $C^2$ are each independently 1,4-cyclohexylene, or 1,4-phenylene; $Z^1$ and $Z^2$ is each independently a single bond, ethylene, methyleneoxy or carbonyloxy; $Z^4$ is ethylene, methyleneoxy or carbonyloxy.

7. The liquid crystal composition according to claim 6, wherein the second component is at least one compound selected from the group of compounds represented by formula (2-3).

8. The liquid crystal composition according to claim 1, wherein a ratio of the first component is from 5% by weight to 70% by weight, and a ratio of the second component is from 5% by weight to 30% by weight based on the total weight of the liquid crystal composition.

9. The liquid crystal composition according to claim 1, wherein the third component is at least one compound selected from the group of compounds represented by formula (3)

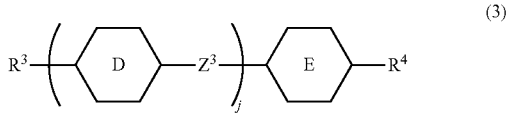

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D and ring E are each independently 1,4-cyclohexylene, 1,4-phenylene, 2-fluoro-1,4-phenylene, 3-fluoro-1,4-phenylene, or 2,5-difluoro-1,4-phenylene; $Z^3$ is independently a single bond, ethylene or carbonyloxy; and j is 1, 2 or 3.

10. The liquid crystal composition according to claim 9, wherein the third component is at least one compound selected from the group of compounds represented by formulas (3-1) to (3-10)

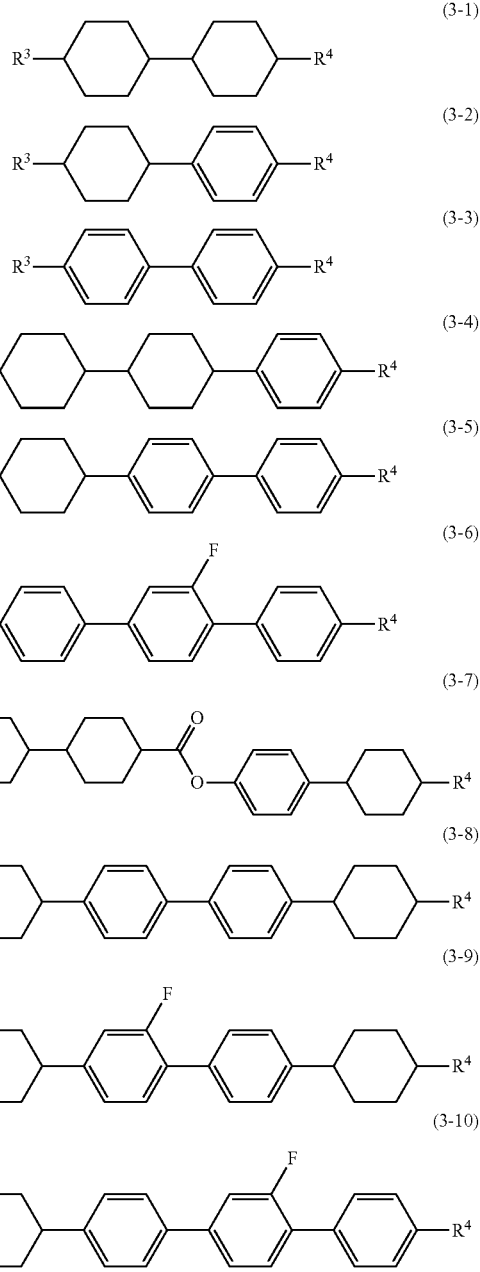

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

11. The liquid crystal composition according to claim 9, wherein a ratio of the third component is from 30% by weight to 70% by weight based on the total weight of the liquid crystal composition.

12. The liquid crystal composition according to claim 1, wherein the fourth component is at least one compound selected from the group of compounds represented by formula (4)

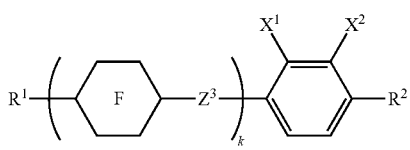
(4)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring F is independently 1,4-cyclohexylene, or 1,4-phenylene; $Z^3$ is independently a single bond, ethylene or carbonyloxy; $X^1$ and $X^2$ are each independently fluorine or chlorine; k is 1, 2 or 3.

13. The liquid crystal composition according to claim 12, wherein the fourth component is at least one compound selected from the group of compounds represented by formula (4-1) to (4-7)

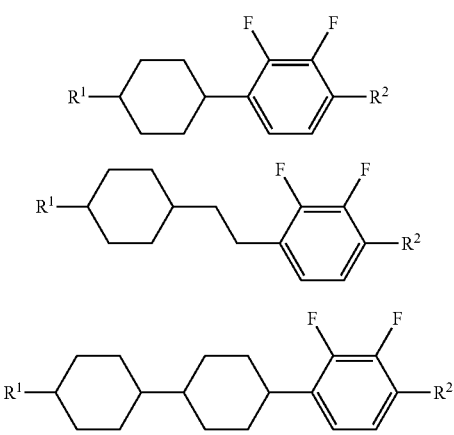
(4-1)
(4-2)
(4-3)

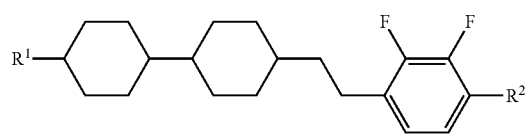
(4-4)

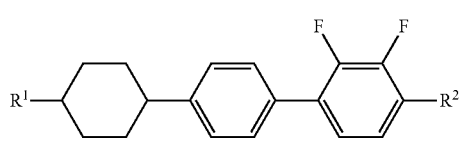
(4-5)

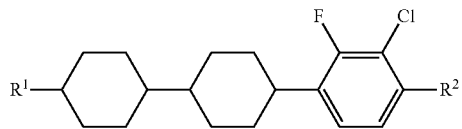
(4-6)

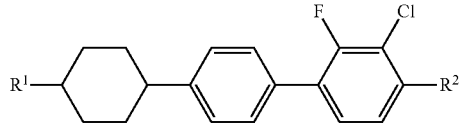
(4-7)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

14. The liquid crystal composition according to claim 12, wherein a ratio of the fourth component is from 5% by weight to 55% by weight based on the total weight of the liquid crystal composition.

15. The liquid crystal composition according to claim 1, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of −2 or less.

16. A liquid crystal device display that includes the liquid crystal composition according to claim 1.

17. The liquid crystal composition according to claim 16, wherein the liquid crystal display device has an operation mode of a VA mode, an IPS mode or a PSA mode, and has a driving mode of an active matrix mode.

\* \* \* \* \*